United States Patent [19]

Yvin et al.

[11] Patent Number: 5,703,009

[45] Date of Patent: Dec. 30, 1997

[54] METHOD AND SYSTEM FOR THE TREATMENT OF SEEDS AND BULBS WITH OZONE

[75] Inventors: Jean-Claude Yvin, Saint Malo; Christian Coste, Versailles, both of France

[73] Assignees: Laboratories Goemar S.A., Saint Malo; Degremont, Rueil-Malmaison, both of France

[21] Appl. No.: 615,250

[22] PCT Filed: Oct. 4, 1994

[86] PCT No.: PCT/FR94/01153

§ 371 Date: Mar. 26, 1996

§ 102(e) Date: Mar. 26, 1996

[87] PCT Pub. No.: WO95/09523

PCT Pub. Date: Apr. 13, 1995

[30] Foreign Application Priority Data

Oct. 4, 1993 [FR] France ................................. 93/11776

[51] Int. Cl.⁶ ............................ A01N 59/00; A01M 13/00

[52] U.S. Cl. ......................................... 504/116; 47/DIG. 9

[58] Field of Search ........................... 504/116; 47/DIG. 9

[56] References Cited

FOREIGN PATENT DOCUMENTS

| | | |
|---|---|---|
| 1-199504 | 8/1989 | Japan . |
| 5-211808 | 2/1992 | Japan . |
| 5-58827 | 3/1993 | Japan . |
| 1166693 | 11/1992 | U.S.S.R. . |

*Primary Examiner*—S. Mark Clardy
*Attorney, Agent, or Firm*—Dennison, Meserole, Pollack & Scheiner

[57] ABSTRACT

A method for improving the germination of seeds or the growth of bulbs in which, prior to planting, the seeds or bulbs are placed into contact with gaseous ozone and the residual moisture content of the seeds or bulbs is adjusted before or simultaneously with the ozone contact to a value in the range of 5 to 60% by weight. The seeds or bulbs produced thereby are suitable for storage without any additional drying step.

11 Claims, 2 Drawing Sheets

METHOD AND SYSTEM FOR THE TREATMENT OF SEEDS AND BULBS WITH OZONE

This application has been filed under 35 USC 371 as a national stage application of PCT/FR94/01153, filed Oct. 4, 1994.

BACKGROUND OF THE INVENTION

The present invention relates to a novel method and an installation for treating seeds and bulbs, for the purpose of improving the germination properties thereof and/or the growth thereof.

A particular application of the invention lies in agriculture and horticulture.

It is known that, when used in the natural state, seeds for agricultural production suffer from a certain number of deficiencies, giving rise in particular to a small germination percentage, to growth defects, and to pathology specific thereto.

Given that seed comes from the soil, various pathogenic organisms exist at the periphery thereof, and the activity of the organisms gives rise to a random germination percentage and to defects in the progress of the plant after germination.

Organizations that produce and sell such seeds are therefore confronted with solving the resulting problems.

It is also known in the prior art that ozone produced from vector gases, that may equally well be oxygen from the air or pure oxygen or a mixture of the two in varying proportions, presents bactericidal, virucidal, fungicidal, and sterilizing properties that have been widely used in treating water and also in industry.

Proposals have also been made in the state of the art to use ozone in the context of treating seeds or plants.

Thus, document JP-44818 suggests stimulating plant growth by increasing the concentration of oxygen at their roots by injecting an ionized gas such as ozone at root level after the plant has been sown.

In document JP-1199504, it is suggested that seeds should be treated by being immersed in water while simultaneously applying ozone and ultrasound to the water.

According to that prior document, the ultrasound generator serves to improve penetration of the water into the seeds, thereby accelerating the action of various varieties of enzymes on the seeds.

In document JP-5211808, proposals are made to immerse seeds in water and to inject ozone therein.

As with the treatment described in the preceding document, this can be done only immediately before the seeds are planted or else an additional drying treatment is required, assuming that it is desired to store the treated seeds for some length of time prior to planting them.

In order to improve the germination properties of seeds, document SU-1166693 proposes subjecting the seed to ozone ventilation in the presence of a powerful oxidizer for a relatively long period of time, in the range 25 hours to 45 hours.

In that prior document, it is mentioned that the cells destroyed by the ozone form components that constitute an excellent nutritional medium for the seeds and that as a result the germination thereof increases by about 9% to 15%.

SUMMARY OF THE INVENTION

It has been discovered, and this constitutes the basis of the present invention, that it is possible to improve the germination properties and/or the growth of seeds and bulbs by treatment with ozone, preferably produced from vector gases, without calling on an additional oxidizing agent, and with the treatment being relatively short in duration, and that the ability of the ozone to reach the ligno-cellulose structures of seeds depends on the moisture content of said structures and as a result it is possible to further improve the results obtained by adjusting the moisture content of the seeds or the bulbs prior to or simultaneously with ozone treatment.

It has also been observed, in a manner that is quite surprising and unexpected, that the effects of treatment in accordance with the present invention continue to be manifest over time and are practically non-reversible under normal conditions of storage prior to planting, and in the absence of contamination by parasites.

Consequently, the treatment method of the present invention does not require any additional drying step, assuming that the treatment is performed on seeds or bulbs for storage over some length of time prior to planting.

Thus, in a first aspect, the present application seeks to cover a method of treating seeds and bulbs, characterized in that prior to planting and for the purpose of improving the germination properties and/or the growth thereof, said seeds or bulbs are put into contact with ozone, preferably produced from vector gases, and in that the residual moisture content of said seeds or said bulbs is adjusted before or simultaneously with their being put into contact with the ozone, preferably to a value lying in the range 5% to 60% relative to the weight of the seeds or the bulbs.

Tests performed on seeds of various origins, representative of major existing families, have shown that ozone treatment without an additional agent serves to improve significantly and unexpectedly the germination rate of the treated seeds, and also the dry matter obtained in the biomass produced.

Ozone has a growth regulator type effect on the seeds with the main characteristics thereof being a reduction in the mechanical effect of cuticle rupture during germination, and also the disappearance of effects due to pathogens present on the surface of the cuticle, and neutralizing or rendering inert any fungal spores or colonies.

Other tests have shown that positive results, of the same kind as those observed with seeds, can be obtained when treating bulbs, in particular iris, tulip, gladiolus, or hyacinth bulbs.

Seeds suitable for treatment by the method of the invention can be of various kinds. The method is particularly applicable to maize, bean, barley, and sunflower seeds.

The ozone suitable for use in the context of the present invention is generally produced from vector gases, preferably in an industrial type ozone generator, where the vector gases are constituted, in particular, by oxygen in the air, or by pure oxygen, or by a mixture of both in varying proportions.

Treatment conditions in accordance with the method of the invention are essentially a function of the type of seed or bulb to be treated, on its moisture content, on the nature and the thickness of its tegument, and on its pathological state.

In general, the person skilled in the art will find it relatively easy to determine the optimum conditions for implementation.

The Applicants have observed that best results are generally obtained when at least one of the following conditions is satisfied:

the quantity of ozone used lies in the range 0.002 to 0.1, expressed in terms of grams of ozone per gram of seed;

the duration of the treatment lies in the range 2 minutes to 30 minutes;

the ozone used is produced from a vector gas, and the concentration of ozone in the vector gas lies in the range 20 g/Nm3 to 100 g/Nm3; and the treatment is implemented in a reactor and the pressure of the gaseous atmosphere within the reactor lies in the range 100 mbar to 1,000 mbar.

Advantageously, the moisture necessary for treatment in application of the invention can be conveyed to the seed by the vector gas.

When the ozone is generated from a vector gas (air or oxygen) of very low humidity (dew point lying in the range −60° C. to −80° C.), it is advantageous to saturate the ozone-containing gas at ambient temperature and pressure by bubbling it through a solution of demineralized water. The gas laden with moisture in this way conveys the additional water to the seeds or bulbs that they were lacking.

This aspect of the invention is particularly original insofar as direct humidification or washing of seed turns out to be impossible in practice.

The seeds are generally put into contact with the ozone within a reactor.

The person skilled in the art will easily be able to determine the type of reactor to use, as a function of the kind, size, and fragility of the seeds or bulbs to be treated.

In general, the reaction of ozone on the surface of seeds takes place by way of a gas-solid type interchange, followed by diffusion within the structure, so to obtain optimum and reproducible treatment it is necessary to select a reactor that is shaped so as to make it possible to ensure continuous renewal of the reaction interface and accessibility for each of the seeds or bulbs to be treated.

In a particular embodiment of the invention, the above-described method is implemented discontinuously, preferably in a reactor stirred about a horizontal axis.

In another embodiment, the method is implemented continuously, preferably in a reactor stirred about a vertical axis.

In a second aspect, the present application seeks to cover an installation for implementing the above-described method, characterized in that it comprises:

a device for producing ozone, preferably in a vector gas;

means enabling the residual moisture content of the seeds or the bulbs to be adjusted, preferably to a value lying in the range 5% to 60% relative to the weight of the seeds or the bulbs; and a reactor to enable the ozone to be put into contact with the seeds or the bulbs, said reactor being organized to enable the reaction interface to be renewed continuously and to provide access to each of the seeds or to each of the bulbs to be treated.

BRIEF DESCRIPTION OF THE DRAWINGS

The invention will be better understood and other objects, characteristics and details thereof will appear more clearly on reading the following explanatory description given with reference to the accompanying examples and diagrammatic drawings given purely by way of non-limiting example, and in which.

DESCRIPTION OF THE PREFERRED EMBODIMENTS

Figure 1:
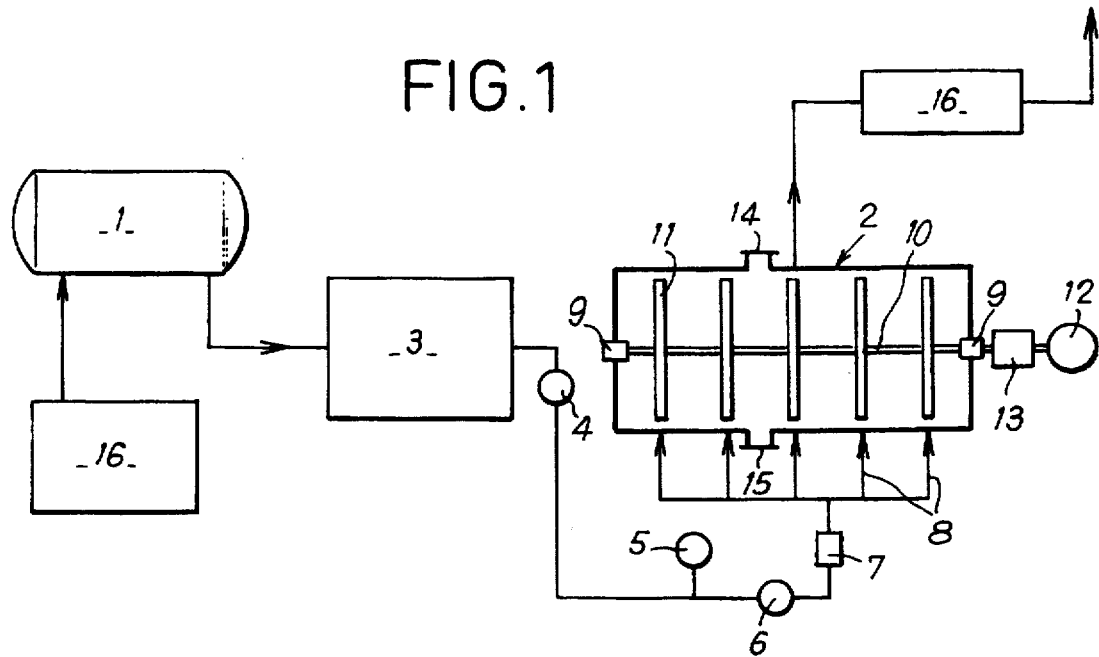
FIG. 1 is a diagram of an installation for implementing the method of the invention in discontinuous manner in a reactor having stirring about a horizontal axis.

With reference to FIG. 1, the description begins with an installation for implementing the method of the present invention in discontinuous (or "batch") mode.

Reference numeral 1 designates an ozone generator of industrial type, e.g. of the type that is fed with electricity at mains frequency (50 Hz) or via a frequency converter with electricity at a frequency lying in the range 600 Hz to 1,200 Hz.

The ozone is produced from vector gases, which may equally well be oxygen in the air, pure oxygen, or a mixture of both in varying proportions.

A vector gas feed source is given reference numeral 16.

The ozone-containing air or oxygen leaving the industrial ozone generator 1 may be fed directly into the reactor 2 for treating seed or bulbs.

Advantageously, in order to adjust the residual moisture content of the seeds or bulbs to be treated, the ozone-containing gas may optionally be humidified by a conventional device, known to the person skilled in the art, and given reference numeral 3, which device serves to saturate the ozone-containing gas with water under conditions of ambient temperature and pressure.

When the ozone-containing gas is subjected to prior humidification treatment, its humidity is measured by means of an industrial type hygrometer represented by reference numeral 4.

The operating conditions of ozone generation can be verified prior to injecting the ozone-containing gas into the reactor 2 by measuring the pressure of the gas flow by means of an appropriate measuring instrument 5 and also by measuring the gas flow rate by means of an appropriate measuring instrument 6. The gas flow may be adjusted by means of a control member given reference numeral 7.

The measuring instruments 5 and 6 and the control member 7 are known to the person skilled in the art and must be selected so as to be capable of withstanding ozone which is a powerful oxidizer.

The ozone-containing gas is injected into the reactor 2 via a set of distribution nozzles 8.

The number of nozzles, and the size thereof, in particular the diameter thereof, can be determined relatively easily by the person skilled in the art as a function of the kind of seeds to be treated, the size of the individual seeds, the specific surface area of the seeds, and the depth of the layer of seeds inside the reactor.

In general, and in a presently preferred embodiment, the number of injection points lies in the range 5 to 15 and the speed of the gas leaving the nozzles lies in the range 20 meters per second (m/s) to 60 m/s.

The reactor 2 is generally cylindrical in shape having a circular cross-section and a horizontal axis, and its vertical end walls include sealing and centering devices designated by reference numeral 9.

Such devices are known per se and are preferably of the type having a mechanical packing with liquid back-pressure.

The devices 9 support and center a cylindrical shaft 10 having a plurality of blades disposed in a vertical plane and distributed in longitudinally spaced-apart units for the purpose of turning over the seeds and of renewing the reaction interface during treatment.

These blade devices also serve to homogenize the layer of seeds during treatment.

The longitudinal distance between two successive blade units is adapted as a function of the type and the kind of seeds or bulbs to be treated.

With seeds, the Applicants have observed that this distance preferably lies in the range 50 mm to 300 mm, for a reactor having a diameter of about 1 m to about 1.2 m.

Similarly, the number of blades in each unit represented by reference numeral 11 must be adapted to the nature of the seeds and to the required amount of turning over. Each unit 11 preferably has four blades all lying in the same plane and uniformly spaced apart angularly, i.e. at 90° intervals.

The shape of the blades must be selected so as to ensure effective turning over of the seeds or the bulbs to be treated and, with seeds, is a function of the size and the kind of seeds involved.

Figure 3A:
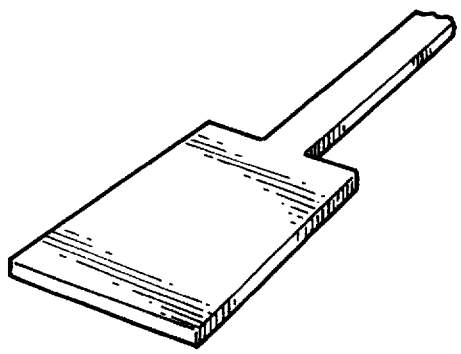
FIGS. 3A and 3B show the shapes of two blades that can be used for turning over the seeds or bulbs in a horizontal axis reactor that operates in discontinuous manner.
Figure 3B:
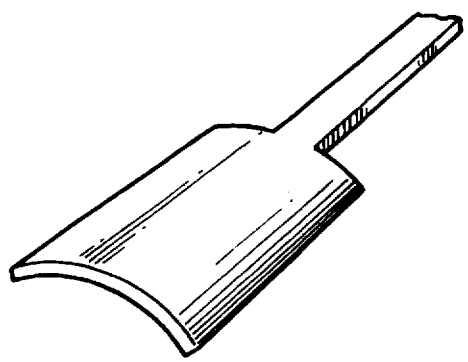

By way of non-limiting example, FIGS. 3A and 3B show two particular blade profiles that satisfy the above-specified requirements.

The cylindrical shaft 10 and the units 11 are secured relative to the axis and they are rotated by an assembly comprising a motor 12 and a gear box 13.

The speed of rotation of the units will naturally vary as a function of the kind of seeds or bulbs, their size, and their relative fragility.

Preferred speeds of rotation lie in the range 20 revolutions per minute (rpm) to 100 rpm.

When the reactor is to be used for treating seeds of various kinds, the electrical power supply of the motor may be via a variable frequency unit in order to adjust the speed of rotation as a function of the kind of seeds.

In its top portion, the reactor 2 includes an orifice 14 for feeding in the seeds or bulbs to be treated, and in its bottom portion it includes an orifice 15 for removing treated seeds or bulbs, said orifice being provided with sealed closure means.

The reactor 2 also includes a gas exhaust duct that opens out into an installation given reference numeral 16 and serving to destroy the residual excess ozone prior to exhausting the gas into the atmosphere.

The installation shown diagrammatically in FIG. 1 thus makes it possible to operate in discontinuous manner applying the so-called "batch" technique.

Figure 2:
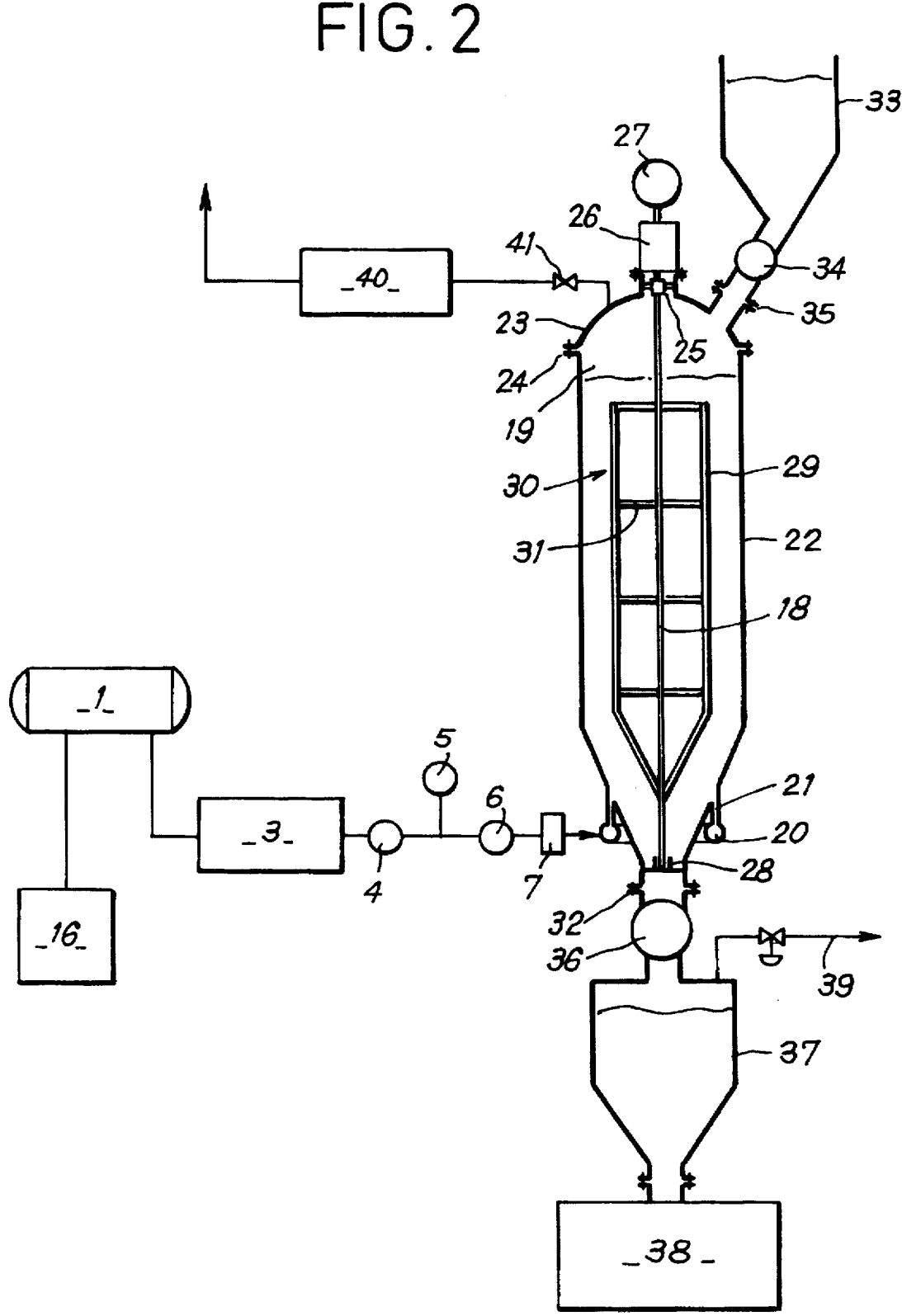
FIG. 2 is a diagram of an installation for implementing the method of the invention in continuous manner in a reactor having stirring about a vertical axis.

FIG. 2 shows an installation for implementing the method of the present invention on a continuous basis.

As described above with reference to FIG. 1, the ozone-containing gas is produced by an industrial ozone generator 1 optionally coupled with a humidifier device 3.

The flow rate of ozone-containing gas can be measured and adjusted by means of the measuring instruments and adjustment members 4, 5, 6, and 7 as described above.

The ozone is injected into a reactor 22 via a toroidal manifold 20 feeding vertical nozzles 21 that open out to the inside of the reactor.

The number and position of the nozzles 21 can easily be determined by the person skilled in the art as a function of the kind of seeds or bulbs to be treated, and as a function of the depth of the layer of seeds or bulbs in the reactor.

The reactor 22 is in the form of a cylindro-conical body having a vertical axis, whose dimensions are designed so as to ensure the contact time required for treatment of the seeds or the bulbs.

The top end of the reactor 22 is closed by a domed end wall 23 secured to the body of the reactor by a flange coupling 24 including sealing and centering means.

The center of the domed end wall 23 which is disposed substantially on the axis of symmetry of the reactor includes an orifice provided with flanges via which there is inserted a guiding, centering, and sealing device 25 of the type having mechanical packing with liquid back-pressure.

A motor 27 coupled to a motor and gear box unit 26 drives the vertical shaft 18 that passes through the reactor and that is centered in the bottom portion thereof via an end bearing type device 28. The shaft 18 is secured to a device 30 for stirring and turning over the seeds or bulbs to be treated, which device is rotated by said shaft.

The motor 27 may be powered via a variable frequency unit in order to enable its speed of rotation to be adjusted as a function of the kind of seeds or bulbs to be treated.

The above-mentioned stirring and turning over device 30 comprises vertical plates 29 of a width lying in the range 40 mm to 100 mm, and connected to the shaft 18 by horizontal arms 31 that serve to center the moving equipment.

The number of turn-over blades or plates 29 is also a function of the size and the nature of the seeds to be treated. In a preferred embodiment, the stirring device has three to six vertical blades 29 uniformly distributed in three dimensions.

The support arms 31 are designed to position blades 29 and also to turn over horizontally the seeds or bulbs to be treated.

At its bottom end, the reactor 22 is provided with a portion in the form of a truncated cone whose bottom end is connected to a device for drawing off treated seeds or bulbs, with the connection being by means of flanges 32 including sealing gaskets.

The domed wall 23 includes a flanged orifice having sealing gaskets and communicating with a storage hopper 33 of sufficient volume to ensure that the reactor can operate autonomously. The hopper 33 is fitted at its bottom end with a volume-measuring-out device 34 which may be of the cellular vane type or of the rotating vane type so as to avoid any damage to the seeds while it is being measured out. The volume-measuring-out device 34 also provides sealing for the reactor, thereby avoiding backflow of gas.

The operation of the installation as described above with reference to FIG. 2 is easily deduced from its structure.

The seeds or bulbs to be treated coming from the storage hopper 33 are fed by gravity into the reactor 22 and they are homogenized by the above-mentioned stirring and turning over device 30.

While the reaction is taking place, the turned-over seeds or bulbs move progressively down through the reactor with depth remaining constant.

When they have travelled a distance corresponding to the height of the reactor, they are withdrawn by an extractor device 36 of the cellular vane type or of the rotary vane type. Thus, as will be understood, it is possible to extract treated seeds or bulbs continuously by adjusting the flow rate of the extractor device 36 to be identical to the flow rate of the extractor device 34 associated with the hopper 33.

At the outlet from the extractor device 36, the seeds or bulbs fall into an intermediate storage hopper 37 connected to a conventional packaging installation given reference numeral 38.

Advantageously, the hopper 37 is provided with an automatic degassing device 39 whose function is to make it possible operate simultaneously under a residual ozone atmosphere that maintains a sterile medium and to evacuate excess ceiling gas from the hopper 37 to a device 40 for destroying residual ozone.

The top portion of the reactor 22 includes a gas ceiling 19 situated above the level fixed for seed or bulbs to be treated.

The gas ceiling collects reaction gas after it has passed through the bed of seed or bulbs, and its volume is continuously exhausted via an adjustment device 41 prior to being injected into the device 40 for destroying excess residual ozone.

At the outlet from the ozone destroyer device 40, the flow of gas can be exhausted to the atmosphere.

The installations described with reference to FIGS. 1 and 2 have been used for treating seeds of various origins, and in particular maize, bean, barley, and sunflower seeds.

Thus, 96 tests have been performed on maize, 32 on beans, 21 on barley, and 14 on sunflower.

Each test was performed with six repeats on average.

For each of the tests, 60 seeds were treated. Each of the batches of seeds was subjected to treatment in accordance with the present invention, was planted in a growing chamber under standard conditions, and was systematically compared with batches of non-treated seeds, that had been planted under the same conditions.

Observations, lifting statistics, and weighings of the resulting biomass were performed after varying durations.

The results obtained were as follows:

germination percentage lying in the range 93% to 97%, depending on the kind of seed treated; and an increase in the dry matter content of the biomass produced lying in the range 8% to 25% depending on the kind of seed; the value of said increase being determined by comparison with the quantity of dry matter obtained from the biomass produced by non-treated seeds.

These tests demonstrate the advantage of treating seeds with ozone, particularly with respect to germination properties and/or growth, and also the advantage of adjusting the residual moisture content of the treated seeds or bulbs.

The optimum conditions defined by the Applicants for each of the above species are as follows:

Kind of seed: maize
Variety: SUMO
Transit time of the seeds through the reactor: 5 min. to 10 min.
Ozone concentration in the vector gas: 20 g/Nm3 to 40 g/Nm3
Pressure of the gaseous atmosphere in the reactor: 100 mbar to 300 mbar
Moisture content of the seeds: 10% to 20%
Ozone treatment rate of the seeds: 0.001 g to 0.028 g of O3 per g of seed
Kind of seed: beans
Variety: VERNEL
Transit time of the seeds through the reactor: 8 min. to 12 min.
Ozone concentration in the vector gas: 20 g/Nm3 to 40 g/Nm3
Pressure of the gaseous atmosphere in the reactor: 100 mbar to 300 mbar
Ozone treatment rate of the seeds: 0.003 g to 0.007 g of O3 per g of seed
Moisture content of the seeds: 10% to 20%
Kind of seed: barley
Variety: TREMOIS
Transit time of the seeds through the reactor: 12 min. to 17 min.
Ozone concentration in the vector gas: 70 g/Nm3 to 90 g/Nm3
Pressure of the gaseous atmosphere in the reactor: 100 mbar to 300 mbar
Ozone treatment rate of the seeds: 0.012 g to 0.016 g of O3 per g of seed
Moisture content of the seeds: 10% to 20%
Kind of seed: sunflower
Variety: DK 3840
Transit time of the seeds through the reactor: 12 min. to 17 min.
Ozone concentration in the vector gas: 30 g/Nm3 to 85 g/Nm3
Pressure of the gaseous atmosphere in the reactor: 100 mbar to 300 mbar
Ozone treatment rate of the seeds: 0.018 g to 0.026 g of O3 per g of seed
Moisture content of the seeds: 10% to 20%

What is claimed is:

1. A method for improving the germination of seeds or the growth of bulbs, comprising, prior to planting, placing said seeds or bulbs into contact with gaseous ozone as a sole oxidizing agent, and adjusting residual moisture content of said seeds or bulbs before or simultaneously with the placing into contact with ozone, to a value in the range of 5% to 60% by weight of the seeds or bulbs, the seeds or bulbs thereby being suitable for storage without any additional drying step.

2. A method according to claim 1, wherein the quantity of ozone is in the range of 0.002 to 0.1 grams per gram of seeds.

3. A method according to claim 1, wherein said seeds or bulbs are placed into contact with ozone for a duration in the range 2 minutes to 30 minutes.

4. A method according to claim 1, wherein the ozone is produced from a vector gas, and wherein the concentration of ozone in the vector gas is in the range 20 g/Nm$^3$ to 100 g/Nm$^3$.

5. A method according to claim 1, wherein said seeds or bulbs are placed into contact with ozone in a reactor having a gaseous atmosphere therein in the range of 100 mbar to 1,000 mbar.

6. A method according to claim 1, wherein said ozone is produced from a vector gas, and wherein in order to adjust the moisture content of said seeds or bulbs, the vector gas is saturated with water at ambient pressure and temperature.

7. A method according to claim 1, wherein said ozone is produced from a vector gas, and wherein in order to adjust the moisture content of said seeds or bulbs, the vector gas is bubbled through demineralized water to cause the vector gas to become saturated with water at ambient pressure and temperatures.

8. A method according to claim 1, wherein said seeds or bulbs are placed into contact with ozone discontinuously, in a reactor having stirring about a horizontal axis.

9. A method according to claim 1, wherein said seeds or bulbs are placed into contact with ozone continuously, in a reactor having stirring about a vertical axis.

10. An apparatus for treating seeds of bulbs, comprising:

a means for generating gaseous ozone;

a reactor for containing seeds or bulbs to be treated;

means for adjusting the seeds or bulbs in the reactor to a residual moisture content of 5 to 60% by weight; and means connecting the means for generating gaseous ozone to the reactor for treating the seeds or bulbs in the reactor at a residual moisture content of 5 to 60% by weight with gaseous ozone, the seeds or bulbs treated in the reactor being suitable for storage without additional drying.

11. Apparatus according to claim 10, wherein the means for adjusting comprises a means for humidifying gaseous ozone disposed between the means for generating gaseous ozone and the reactor.

* * * * *